US006976797B2

(12) United States Patent  
Herron (10) Patent No.: US 6,976,797 B2
(45) Date of Patent: Dec. 20, 2005

(54) METHODS AND SYSTEMS FOR RENDERING PRINTING MARKS IN MULTIPLE DEVICE PRINTING ENVIRONMENTS (75) Inventor: Stephen K. Herron, Orillia (CA)

(73) Assignee: Xerox Corporation, Stamford, CT (US)

( * ) Notice: Subject to any disclaimer, the term of this patent is extended or adjusted under 35 U.S.C. 154(b) by 108 days.

(21) Appl. No.: 10/758,508

(22) Filed: Jan. 14, 2004

(65) Prior Publication Data

US 2005/0152727 A1 Jul. 14, 2005

(51) Int. Cl.[7] .................................................. B41J 5/30
(52) U.S. Cl. ........................... 400/61; 400/62; 400/76; 358/1.15
(58) Field of Search ............................ 400/61–63, 70, 400/76; 358/1.13–1.18, 1.2, 1.9

(56) References Cited

U.S. PATENT DOCUMENTS

| 5,978,559 A | 11/1999 | Quinion | 358/1.15 |
| 5,995,721 A | 11/1999 | Rourke et al. | 358/1.15 |
| 6,188,487 B1 | 2/2001 | Matsubara | 358/1.15 |
| 6,254,290 B1 * | 7/2001 | Imai et al. | 400/76 |
| 6,348,971 B2 * | 2/2002 | Owa et al. | 358/1.15 |
| 6,573,910 B1 | 6/2003 | Duke et al. | 345/740 |
| 6,650,431 B1 | 11/2003 | Roberts et al. | 358/1.15 |
| 6,654,136 B2 | 11/2003 | Shimada | 358/1.15 |
| 6,687,018 B1 * | 2/2004 | Leong et al. | 358/1.15 |
| 6,809,841 B2 * | 10/2004 | Brewster | 358/3.31 |
| 6,891,634 B1 * | 5/2005 | Nihei | 358/1.15 |
| 2002/0071134 A1 | 6/2002 | Jackson et al. | 358/1.13 |

* cited by examiner

Primary Examiner—Minh Chau
(74) Attorney, Agent, or Firm—Kermit D. Lopez; Luis M. Ortiz; Ortiz & Lopez, PLLC (57) ABSTRACT Methods and systems for rendering printing marks in multiple-device printing environments such as printshops are disclosed. In general, one or more printers among a plurality of printers in a multiple device printing environment can be identified for rendering a print job. The mark can then be automatically and dynamically rendered upon the print job based on the required resources and needs of the printers operating within the multiple-device printing environment during or after an imposition of the print job.

20 Claims, 8 Drawing Sheets

FIG. 1

| Symbol | Name | Position of symbol |
|---|---|---|
| + | CrossCutMark | Centered at logical position |
| + | TopVerticalCutMark | Slightly above logical position |
| + | BottomVerticalCutMark | Slightly below logical position |
| + | LeftHorizontalCutMark | Slightly to the left of logical position |
| + | RightHorizontalCutMark | Slightly to the right of logical position |
| + | LowerLeftCutMark | Corner at logical position |
| + | UpperLeftCutMark | Corner at logical position |
| + | LowerRightCutMark | Corner at logical position |
| + | UpperRightCutMark | Corner at logical position |

Marks Database

| Index | Marks |
|---|---|
| 1 | Cut marks |
| 2 | Fold marks |
| 3 | Registration Targets |
| 4 | Color control strips |
| 5 | Density control strips |
| 6 | Slur stars |
| 7 | Administration descriptions |

*FIG. 5*

Printer Directory

| Printer Name | Marks/Location Indices |
|---|---|
| Printer 1 | 1, 2, 3, 4, 5, 7 |
| Printer 2 | 1, 2, 5, 7 |
| Printer X | 1, 2, 4, 7 |

*FIG. 6*

Marks Location Database

| Index | Location Coordinates |
|---|---|
| 1 | x,y |
| 2 | x,y |
| 3 | x,y |
| 4 | x,y |
| 5 | x,y |
| 6 | x,y |
| 7 | x,y |

METHODS AND SYSTEMS FOR RENDERING PRINTING MARKS IN MULTIPLE DEVICE PRINTING ENVIRONMENTS

TECHNICAL FIELD

Embodiments are generally related to printshops. Embodiments also relate to the processing of print jobs in a printshop environment. Embodiments are also related to methods and systems for rendering printing marks for use in a printshop workflow.

BACKGROUND OF THE INVENTION

Printshops are generally known as digital publishing configurations that contain one or more hard-copy output device devices, such as, for example, an offset press, an electro photographic printer, an inkjet printer and the like. Printshops convert printing orders, also known as print jobs, into finished printed material. Conventional methods stress the breaking of the print job down into component parts with the processing of each part of the print job occurring only following the completion of the previous part of the print job. Printshops do not necessarily constitute an organization in which all printing equipment is co-located together, but may in fact constitute partnerships between varying organizations whose locations may be geographically dispersed from one another. For example, one location may involve short-run print jobs, while other locations may generate long-run print jobs.

Conventional printshops are organized in a fashion that is functionally independent of print job complexity, print job mix, and total volume of print jobs. Typically, related equipment is grouped together. Thus, all printing equipment is grouped and located in a single locale. Similarly, all finishing equipment is generally grouped and located in a single locale. In other words, conventional printshops organize resources into separate departments, where each department corresponds to a type of process or operation that is performed to complete a print job. When a print job arrives from a customer, the print job sequentially passes through each department. Once the print job is completely processed by a first department, the print job gets queued for the next department.

Recent developments in the field of printing have seen emerging standards for printshop independent job description languages (PSDL). Such file formats allow for the specification of a printshop job in an independent manner. The details of the job, such as operations to be performed, resources required, and the actual data content of the job are included in the file. One such PSDL format, PPF (Print Production Format), was developed by the CIP3 consortium, the International Cooperation for Integration of Prepress, Press and Post press to provide a data packet that can be read by any CIP3 compliant vendor. Other examples of PSDL formats are the JDF and PCX file formats. When the print job is received by the printshop, the print job must be extracted from the PSDL file and a work plan generated (i.e., workflow). Normally, however, the customer is not aware of the printshop workflow, and hence, job content thereof does not include PSDL. PSDL is typically added by the printer.

The CIP3 Specification on Print Production Format, Version 2.1, for example, describes standard shapes and sizes for printer marks. CIP3 specification assumes that the prepress operator "knows" the output device requirements and how to generate and properly place such marks, usually by utilizing the capabilities of an imposition software application. Ideally, printer's marks should be added to a print job during prepress operations. Unfortunately, the addition of such printer's marks makes the job device-dependent. Printer's marks should therefore be automatically added to the job after the printer is selected and after the imposition is performed in the print data stream. Frequently the output device is not known at the prepress stage, or may be printed on varying devices having different printer's marks. Even if the device is known, the device's printer's marks are not known. Embodiments disclosed herein address such problems.

BRIEF SUMMARY

It is, therefore, a feature of the present invention to provide for an improved printshop workflow environment.

It is another feature of the present invention to provide improved methods and systems for effectively rendering printing marks for use in a printshop environment.

Aspects of the present invention relate to methods and systems for rendering printing marks in multiple output-device printing environments. In general, one or more printers in a multiple device printing environment can be identified for rendering a print job. The marks can then be automatically and dynamically rendered upon the print job based on the required resources and needs of the printers operating within the multiple-device printing environment during or after an imposition of the print job.

A database can be compiled that includes a plurality of marks wherein each mark is associated with a particular index. The database is generally associated with the multiple-device printing environment. Additionally, a directory of associations of printers can be associated within the multiple device printing environment and indices thereof, such that each index among the indices is associated with a particular mark or type of mark. The indexing of marks allows for the modification of the marks without changing the database look-up process.

Additionally, a database of location descriptions of each mark renderable upon at least one print job associated with each printer among one or more of the printers within a multiple device printing environment can be established. Each location can also be associated with an index. Likewise, the location can be modified without altering the database look-up process.

A linker component can also be provided, which receives a name associated with printer. The linker component automatically looks up associated indices. The indices direct the linker to find the appropriate printer's marks and a location coordinate associated with each mark. The linker dynamically determines the appropriate marks from the plurality of marks, and then embeds one or more marks into the print job at the associated locations.

BRIEF DESCRIPTION OF THE DRAWINGS

The accompanying figures, in which like reference numerals refer to identical or functionally-similar elements throughout the separate views and which are incorporated in and form part of the specification further illustrate embodiments of the present invention

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
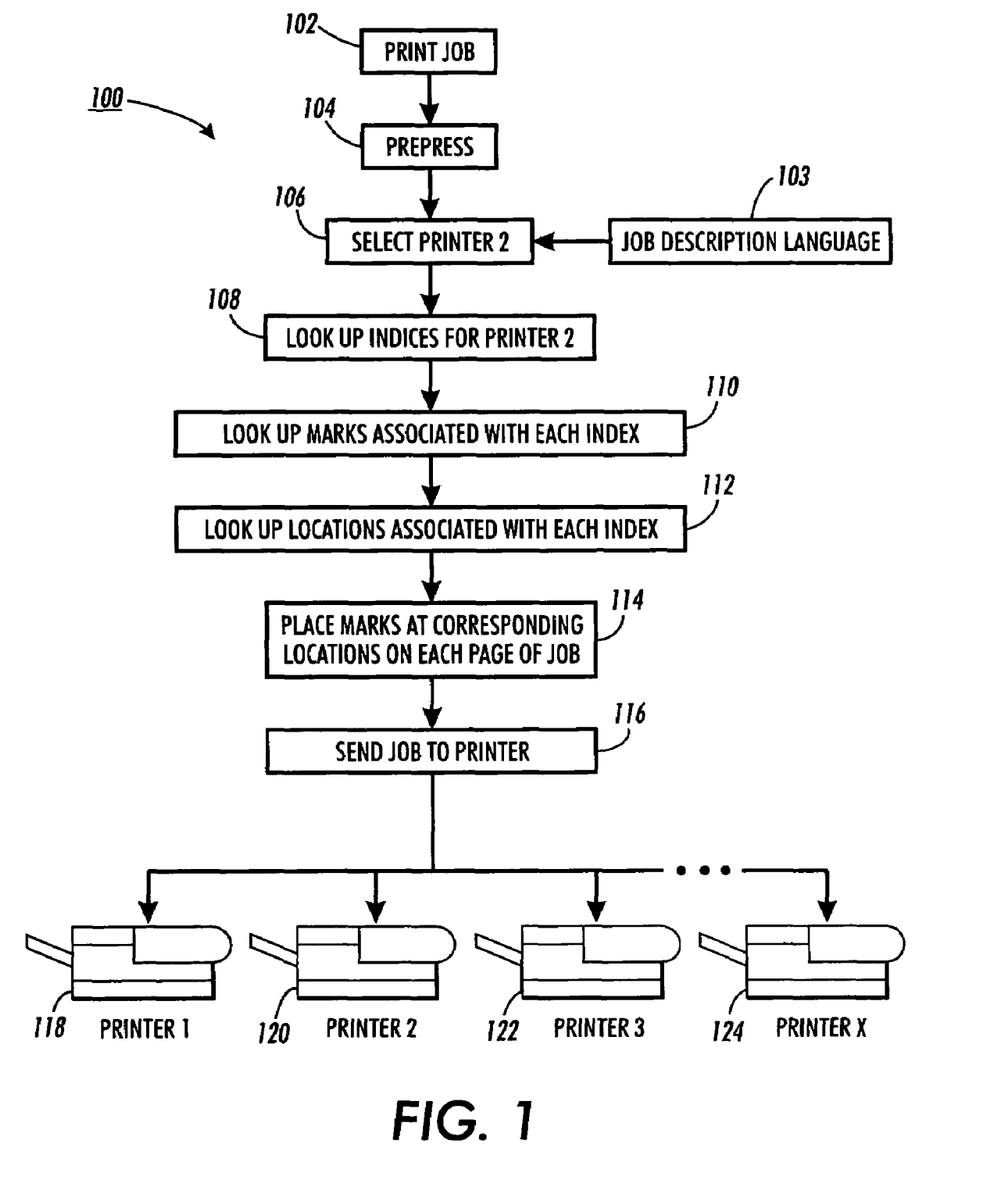
FIG. 1 illustrates a block diagram of a flow chart of operations, which can be implemented in accordance with a preferred embodiment of the present invention.

FIG. 1 illustrates a flow chart 100 of operations, which can be implemented in accordance with an embodiment of the present invention. As indicated at block 102, a print job is generated, and thereafter as depicted at block 104, a prepress operation is processed, which is responsive to a job description language (e.g. PSDL) as indicated at block 103. Next, a second printer (i.e. Printer 2) can be selected, as indicated at block 106. Look up indices can then be established, as indicated at block 108. Look up marks are then associated with each index thereof, as indicated at block 110. Next, as depicted at block 112, look up locations can be associated with each index.

Marks can then be placed at corresponding locations on each page of the print job, as illustrated at block 114. The print job can then be sent to the printer, as depicted at block 116. In the scenario of FIG. 1, a plurality of printers (i.e., Printer 1, Printer 2, Printer 3, and Printer X) is indicated, as respectively illustrated at blocks 118, 120, 122, and 124. In the example of FIG. 1, the print job is sent to Printer 2, as indicated by blocks 116 and block 120. It can be appreciated that FIG. 1 represents one possible embodiment of the present invention. For example, instead of selecting Printer 2, as indicated at block 106, one of the other printers (i.e., Printer 1, Printer 3, and/or Printer X) can be selected. If Printer 3 is selected for example, then as depicted at block 108, a look up operation can be processed in which indices associated with Printer 3 are identified. Processing of the operation illustrated at blocks 114 and 116 can result in a rendering of the print job at Printer 3 (i.e., block 122).

Note that the above-referenced flow chart 100 can be implemented in the context of "modules". In the computer programming arts, a "module" can be typically implemented as a collection of routines and data structures that performs particular tasks or implements a particular abstract data type. Modules generally are composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media. One or modules can be therefore be implemented to process the instructions provided via blocks 106–116 of FIG. 1.

Figure 2:
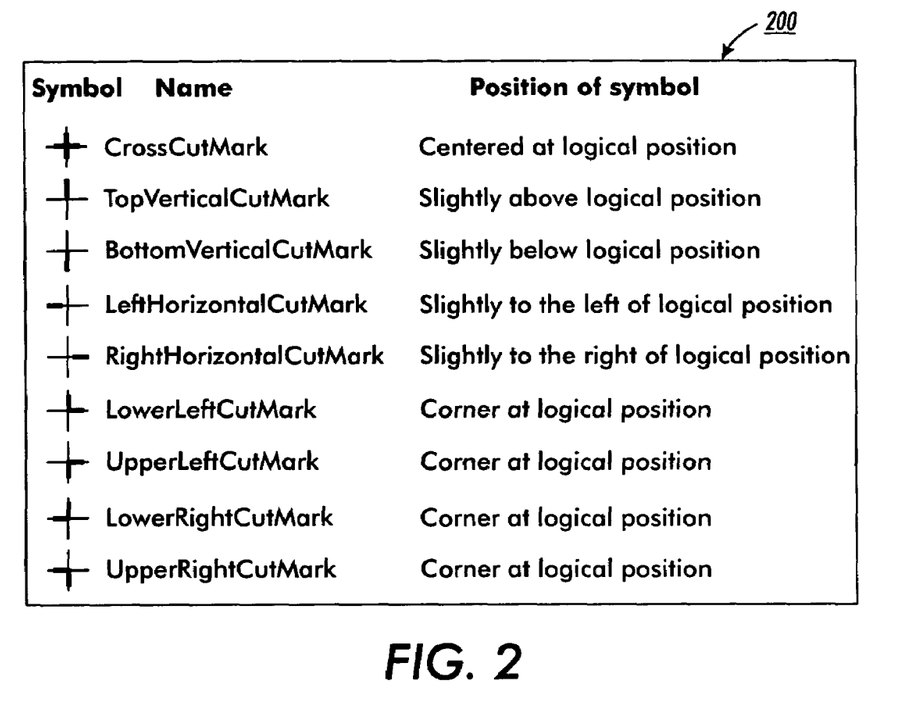
FIG. 2 illustrates an exemplary set of predefined cut marks which can be utilized in accordance with an embodiment of the present invention.

FIG. 2 illustrates an exemplary set of predefined cut marks 200, which can be utilized in accordance with an embodiment of the present invention. Marks 200 represent one type of printing marks, which can be rendered according to the embodiments disclosed herein. It can be appreciated that other types of marks can also be rendered, such as fold marks, registration targets, density/color control stripes, slur stars, administrative descriptions and the like, which are typically utilized in printshop environments. In FIG. 2, the set of predefined cut marks 200 generally indicates the geometric shape of each predefined mark type, along with the name, symbol and position thereof.

Figure 3:
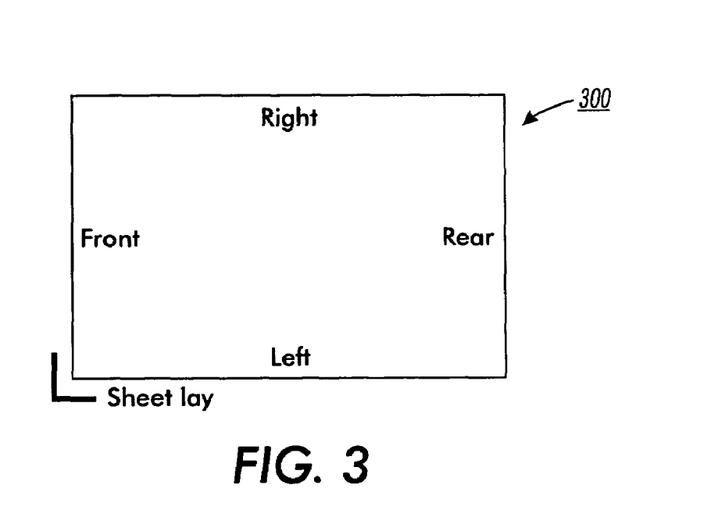
FIG. 3 illustrates an example of a mark that references edges of a sheet, wherein fold marks can be located in accordance with an embodiment of the present invention.
Figure 4:
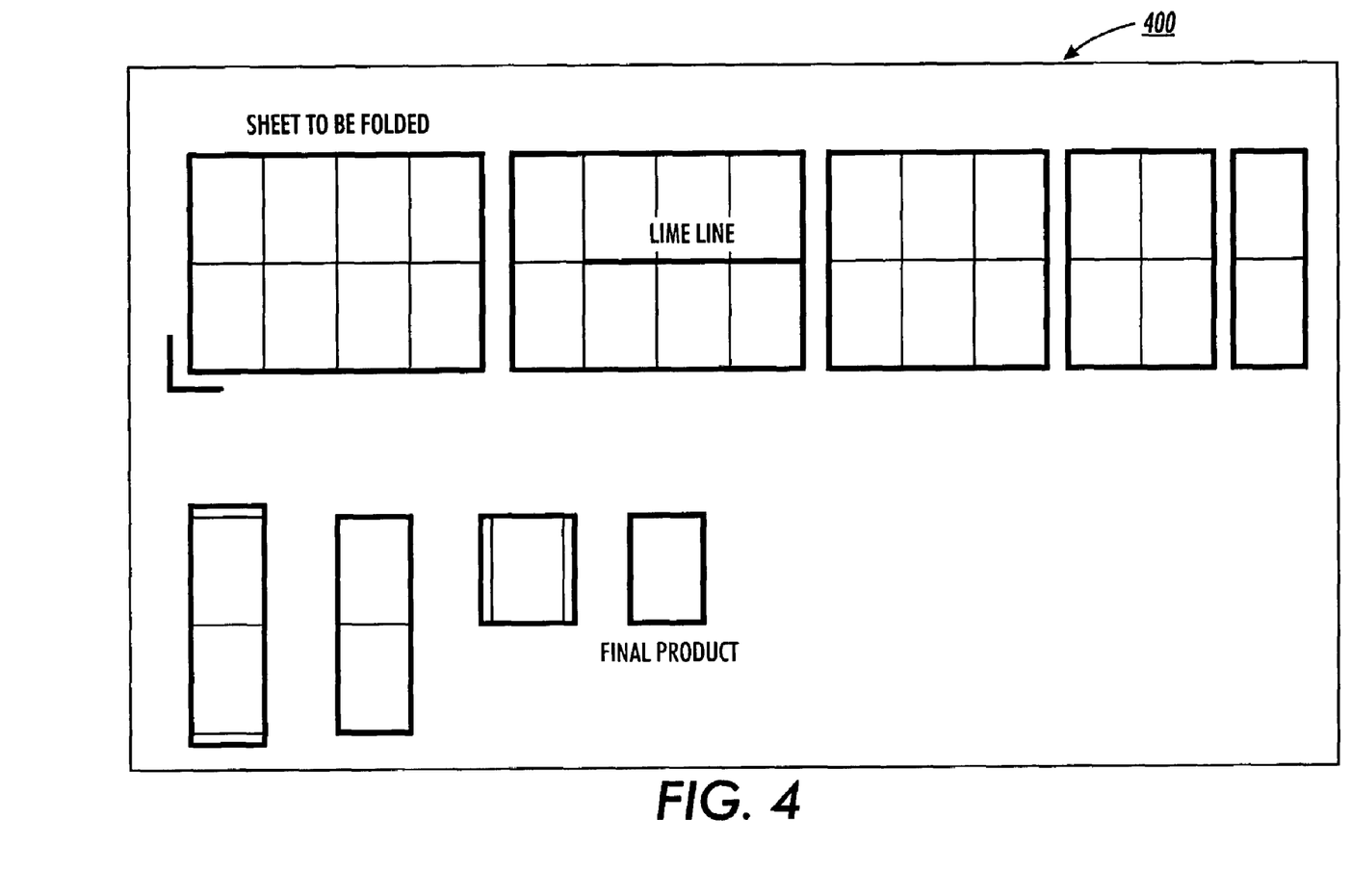
FIG. 4 illustrates a block diagram of a folded product, wherein fold-procedure marks may be placed in accordance with an embodiment of the present invention.

FIG. 3 illustrates reference edges of a sheet 300, which can be folded in accordance with an embodiment of the present invention. In general, the creation of a folded product can be implemented via a folding procedure, which designates the size of the input sheet. If the size does not match the size of a corresponding cut block, all coordinates of the folding procedure are scaled respectively, thereby allowing for a folding procedure than be used with varying sizes. The various sizes represent example of the need to dynamically select a printer's marks locations. In FIG. 3, reference edges are indicated in example sheet 300 as Front, Right, Rear and Left. FIG. 4 illustrates a block diagram of a folded product 400, which may be generated in accordance with an embodiment of the present invention. In FIG. 4, the actual folding procedure is depicted, from a sheet to be folded to a final product. The marks and indices are intended as examples only. Many more types of marks can be incorporated into a database of marks.

Figure 5:
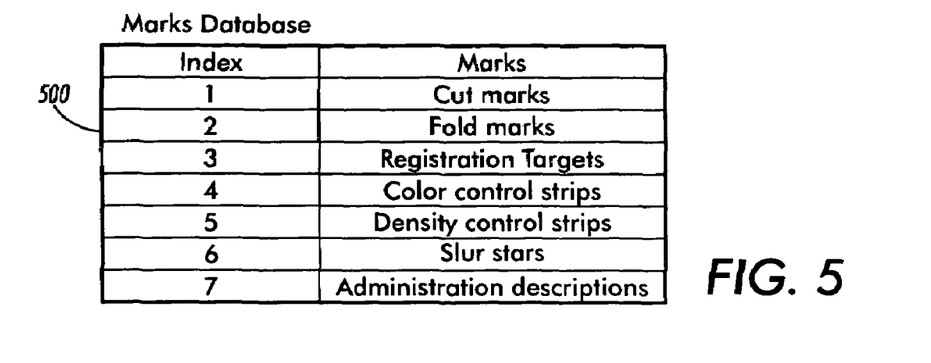
FIG. 5 illustrates a block diagram of a database, which may be implemented in accordance with an embodiment of a present invention.

FIG. 5 illustrates block diagram of a database 500, which may be implemented in accordance with an embodiment of a present invention. Database 500 includes a plurality of printer's marks (i.e., a plurality of marks), which can be described for example, in PostScript and/or Portable Document Format (PDF). Database 500 includes marks such as cut marks, fold marks, registration targets, color control strips, density control strips, slur stars, and administrative descriptions, which are respectively associated with indices 1 to 7. Database 500 therefore includes a plurality of marks, such that database 500 is associated with a multiple device printing environment, such as, for example, a printshop.

Note that PDF is a standard format for the secure and reliable distribution and exchange of electronic documents and forms utilized in commercial, consumer and other applications. PDF is a universal file format that preserves the fonts, images, graphics, and layout of any source document, regardless of the application and platform used to create it. PDF file format allows users to view and print highly complex documents that retain their original formatting. Such types of files are commonly utilized for publications that are not easily translated into, for example, HTML and other such programming codes. PostScript, on the other hand, is a programming language intended for printing graphics and text. PostScript is a page description language, which provides a convenient language in which to describe images in a device independent manner. This device independence means that the image is described without reference to any specific device features (e.g. printer resolution) so that the same description could be used on any PostScript-enabled output device or printer without modification.

Figure 6:
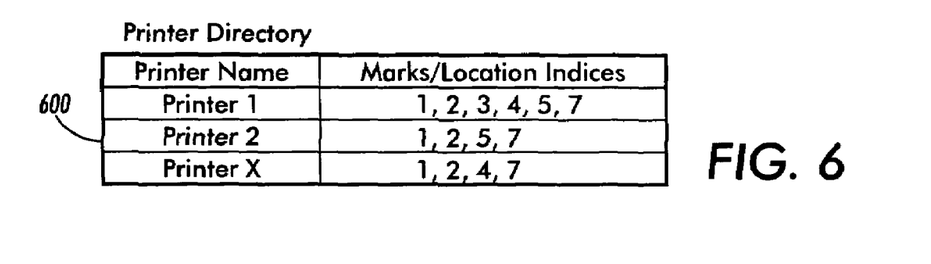
FIG. 6 illustrates block diagram of a printer directory, which may be implemented in accordance with an embodiment of a present invention

FIG. 6 illustrates block diagram of a printer directory 600, which may be implemented in accordance with an embodiment of a present invention. Printer directory 600 can be established to associate the parts to the printers. Printer directory 600 can be implemented as a directory of associations between the name of an individual printing devices or printers and indices. For example, a first printer or "Printer 1" is associated with indices 1,2,3,4,5,7, while a second printer or "Printer 2" is associated with only indices 1,2,5,7. Each index is associated with a different mark.

Figure 7:
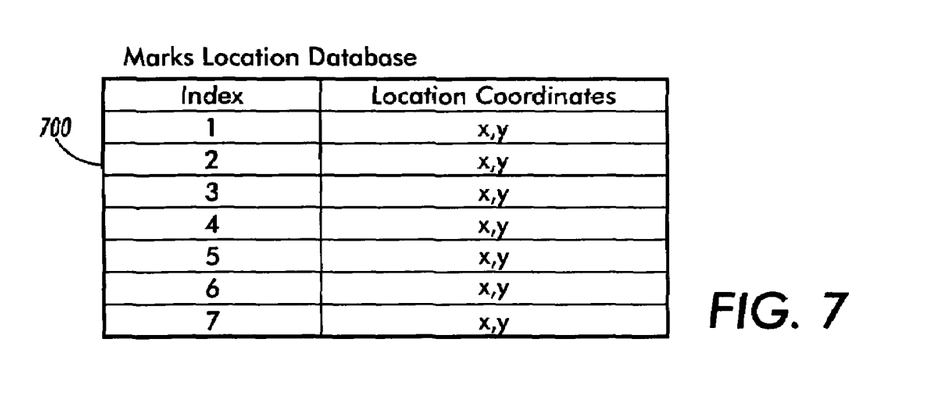
FIG. 7 illustrates block diagram of a database, which may be implemented in accordance with an embodiment of a present invention

FIG. 7 illustrates a block diagram of a database 700 of indices and mark locations, which may be implemented in accordance with an embodiment of a present invention. Database 700 generally comprises a database of location descriptions (e.g., location coordinates in planer or polar coordinates) of each mark renderable upon at least one print job associated with each printer among a plurality of printers within a multiple device printing environment (e.g., a printshop). In the example database 700 depicted in FIG. 7, each index 1 to 7 is respectively associated with a location coordinate x,y, which of course, may vary. For example, a printer or "Printer 1" can be associated with indices 1,2,3, 4,5,7, while a second printer or "Printer 2" can be associated with only indices 1,2,5,7. Each index can be associated with a different location. Printer 1 utilizes the marks associated with indices 1, 2, 3, 4, 5, 6, 7 and each mark thereof can be located at page coordinates associated with a second set of indices.

Figure 8:
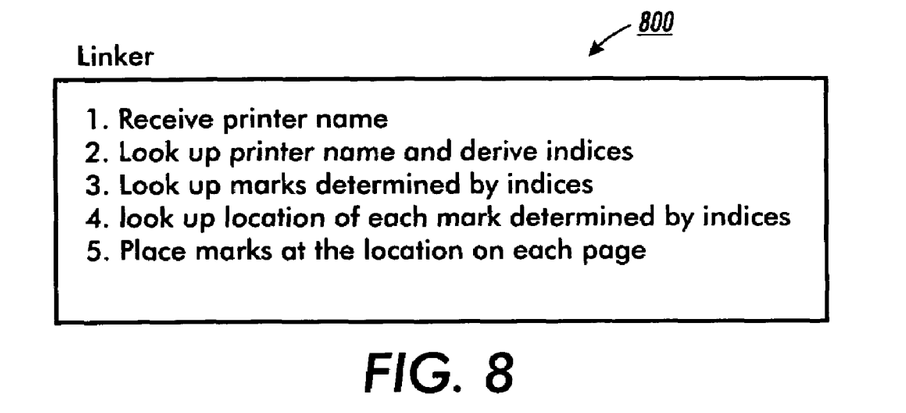
FIG. 8 illustrates block diagram of a linker module, which may be implemented in accordance with an embodiment of a present invention.
Figure 9:
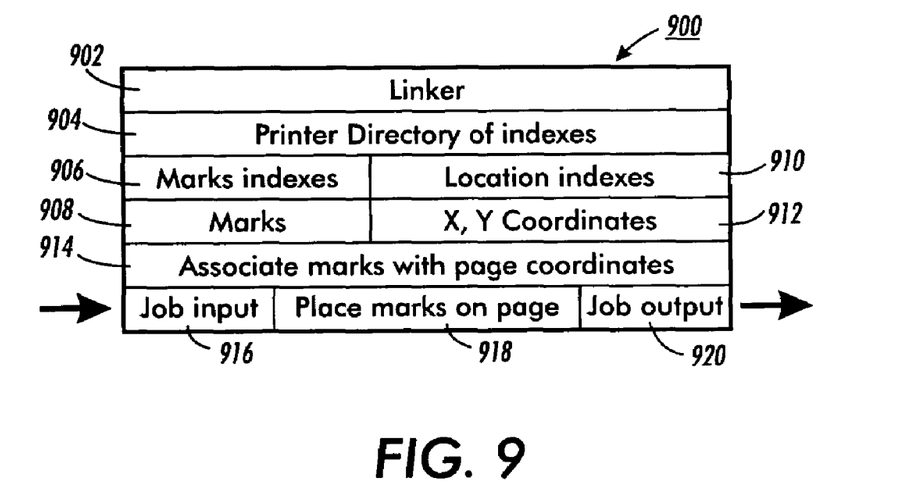
FIG. 9 illustrates block diagram of a system, which may be implemented in accordance with an embodiment of a present invention.

FIG. 8 illustrates block diagram of a linker module 800, which may be implemented in accordance with an embodiment of a present invention. Linker module 800 can receive a printer name, and can also look up a printer name and derive indices thereof. Linker module 800 also can look up marks determined by indices and thereafter look up the location of index. Finally, linker module 800 can place marks at an appropriate location on each page of a particular print job. An example of a PostScript vector description for registration marks is provided below:

% CIP3BeginRegisterMarks
30.0 30.0 0/regml
625.0 30.0 0/regml
625.0 872.0 0/regml
30.0 30.0 0/regml
% CIP3EndRegisterMarks FIG. 9 illustrates block diagram of a system 900, which may be implemented in accordance with an embodiment of a present invention. System includes a linker or linker module 902, which receives the name of a printer and then looks up a directory listing within a printer directory 904. Printer directory 904 includes a number of printer names and indices of marks and locations. System 900 also includes a database 908 of marks and associated indexes 906, and a database of location 910 descriptions and indices 912. Note that database 906 is generally analogous of database 500 of FIG. 5. Similarly, printer directory 910 is analogous to directory 600 of FIG. 6. Linker module 902 is analogous to linker module 800 of FIG. 8. Database 908 is analogous to database 800 of FIG. 7. Linker 902 associates marks with locations 914 and places marks on a page, as indicated at section 918 of system 900. Job input 916 and job output 920 sections are also depicted in system 900 of FIG. 9.

Figure 10:
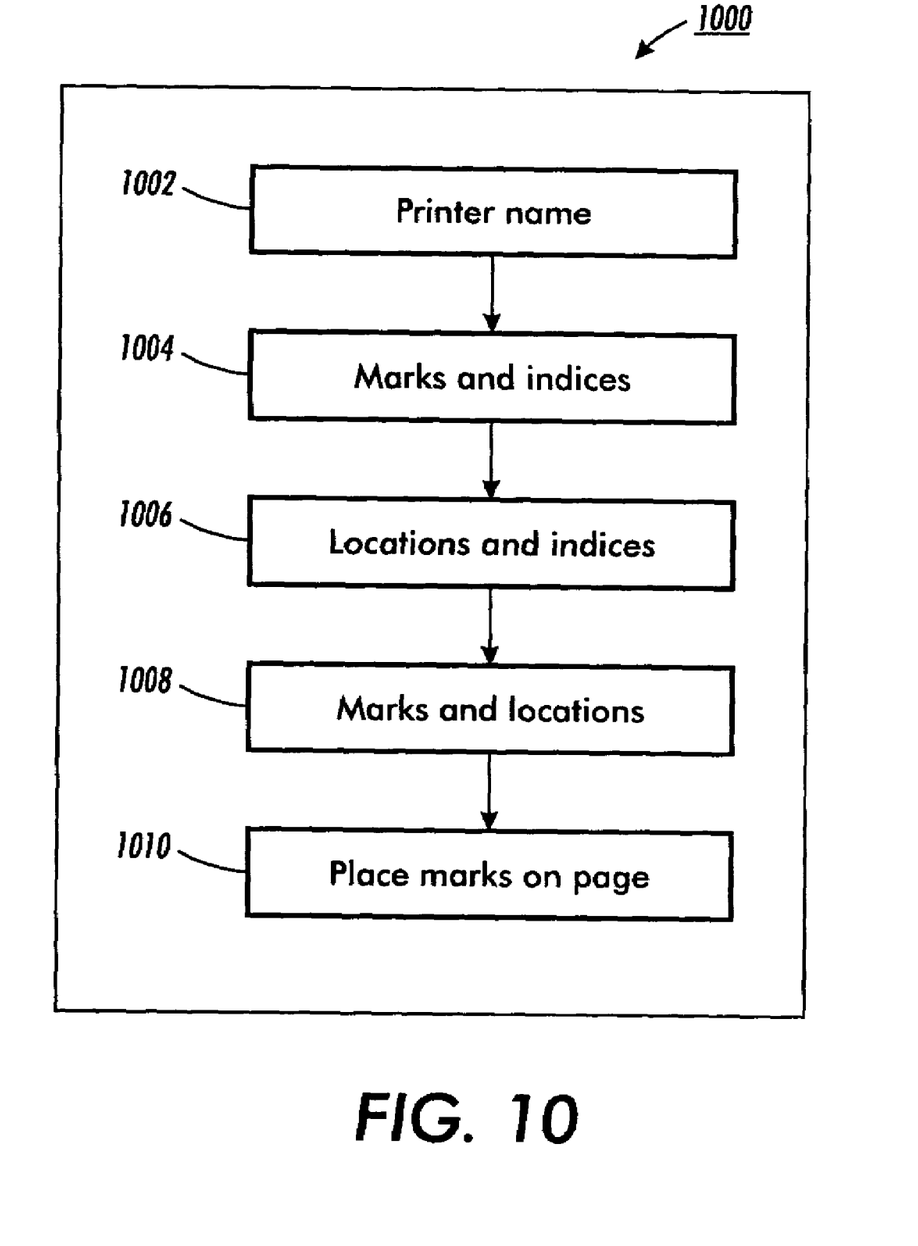
FIG. 10 illustrates a high level flow chart of operations indicative of logical operation steps, which may be implemented in accordance with an embodiment of a present invention.

FIG. 10 illustrates a high level flow chart 1000 of operations indicative of logical operation steps, which may be implemented in accordance with an embodiment of a present invention. As indicated at block 1002, one or more printer names can be identified from a directory of printer names, such as printer directory 904 of FIG. 9. Next, as depicted at block 1004, the marks and associated indices are read from a database, such as database 906/908 of FIG. 9. Thereafter, as illustrated at block 1006, the marks and locations are determined from a directory such as directory or database 904 of FIG. 9. Next, as indicated at blocks 1008 and 1010, the marks themselves can be placed on a page of a print job.

FIGS. 9 and 10 in particular illustrate scenarios in which a directory is derived that associate printers and/or names of printers to indices. Printer's marks can be contained in a database, wherein such marks are generally described in PostScript and/or as PDF files. Additionally, the selection of a printer and its associated indices can result in a database search for the appropriate marks. Also, a database of location descriptions is established for each of the marks on a page for each printer.

Finally, a linker or linker module receives the name of the printer, looks up the directory index listing, looks up the marks, looks up the location coordinates for each mark, reads the marks from the database, and embeds such information into the print job at the appropriate location. Each marks' location can be expressed in planar or polar coordinates. System 900 of FIG. 9 can be embodied, for example, as one or more components and/or modules in a printer driver, as an Acrobat or PDF "plug in module", as a component to a prepress software application and/or as a unique application associated with a controller that adds marks into an image data stream prior to processing of a printer driver software.

Figure 11:
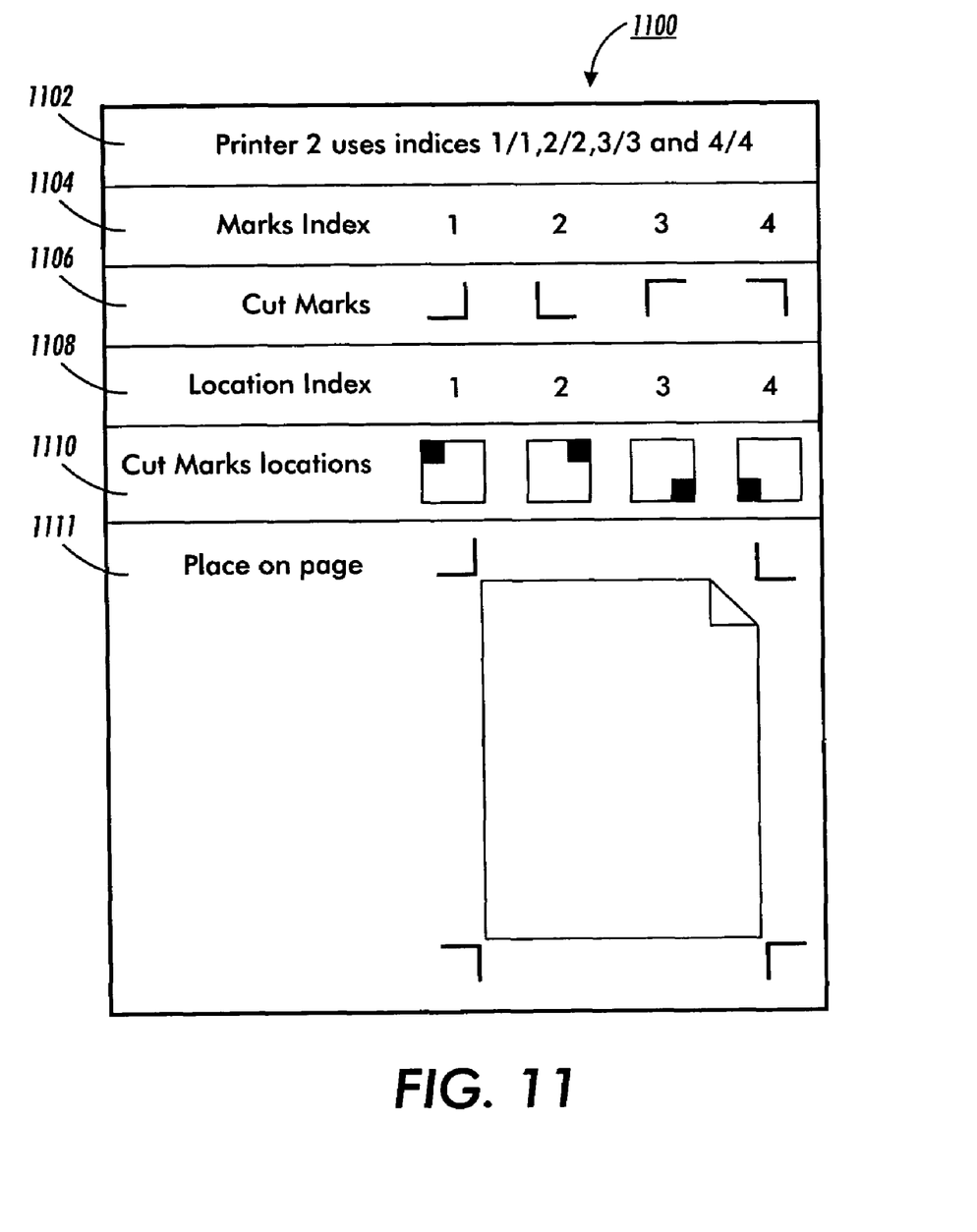
FIG. 11 illustrates a block diagram depicting the usage of marks and locations, in accordance with an embodiment of the present invention.

FIG. 11 illustrates a block diagram depicting a page 1100 and the usage of marks 1106 and locations 1110, in accordance with an embodiment of the present invention. FIG. 11 depicts an example of the usage of marks and locations, indices to such marks and locations and the printed result of the marks on the page. In the example of FIG. 11, a linker can receive the name of "printer 2" and looks up associated indices 1102. Indices 1104 (i.e., indices 1, 2, 3, 4) refer to marks 1106 (i.e., cut marks). Similarly, indices 1108 can refer to locations 1, 2, 3, (i.e., locations 1110). The linker can then place the marks at the appropriate locations 1111 on page 1110.

Figure 12:
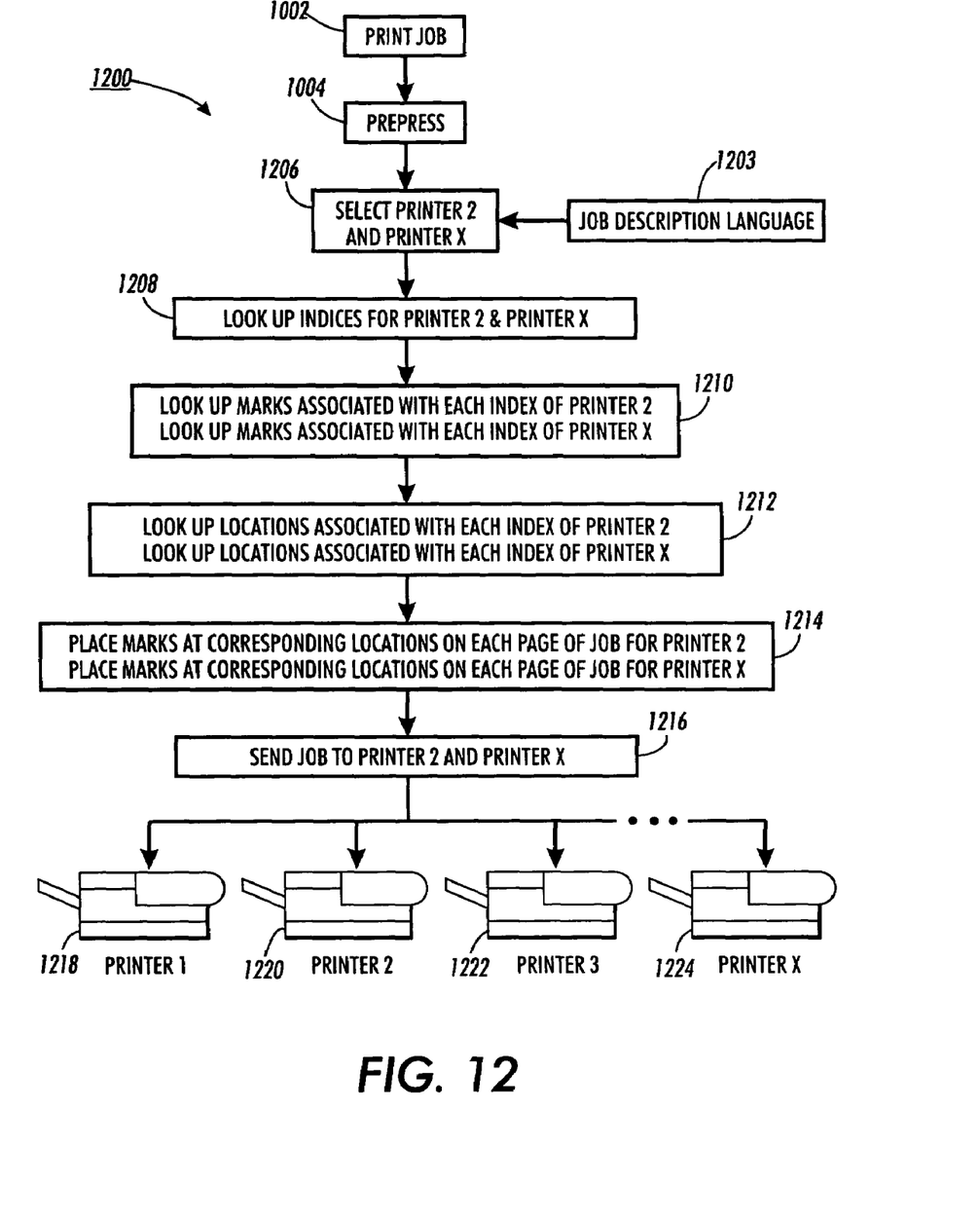
FIG. 12 illustrates a block diagram of a flow chart of operations, which can be implemented in accordance with a preferred embodiment of the present invention.

FIG. 12 illustrates a block diagram of a flow chart 1200 of operations which can be implemented in accordance with an alternative embodiment of the present invention. FIG. 12 depicts an example of how one print job can printed on two printers. As indicated at block 1202, a print job can be generated, and thereafter as depicted at block 1204, a prepress operation can be processed, which is responsive to a job description language (e.g. PSDL) as indicated at block 1203. Next, a second printer (i.e. Printer 2) and an additional printer (i.e., Printer X) can be selected, as indicated at block 1206. Thereafter, as illustrated at block 1208, an operation can processed in which marks and location indices are looked up for Printer 2 (e.g., 1, 2, 5, 7) and Printer X (e.g., 1, 2, 4, 7). Refer to FIG. 6 for an example of such a look up process.

Thereafter, as depicted at block 1210, the marks for both Printer 2 and Printer X can be extracted from the marks database. Next, as described at block 1212, an operation can be processed in which the locations of the marks for both Printers 2 and X are looked up. Thereafter, as described at block 1214, can be in their appropriate locations on each page of the print job and thereafter, as indicated at block 1216, the print job is delivered to Printer 2, which is indicated by block 1220. Concurrently or simultaneously, Printers X's marks can be placed in their appropriate locations on each page of the print job as indicated at block 1216. The print job can thus also be delivered to Printer X (i.e., see block 1224), rather than Printer 1 and/or Printer 2, which are respectively represented by blocks 1218 and 1222.

It is appreciated that various other alternatives, modifications, variations, improvements, equivalents, or substantial equivalents of the teachings herein that, for example, are or may be presently unforeseen, unappreciated, or subsequently arrived at by applicants or others are also intended to be encompassed by the claims and amendments thereto.

What is claimed is:

1. A method, comprising:
    establishing a database comprising a plurality of marks;
    associating said database with a multiple-device printing environment;
    identifying at least one printer among a plurality of printers in said multiple-device printing environment for rendering a print job; and
    automatically and dynamically rendering at least one mark among said plurality of marks upon said print job based on a required resource of said at least one printer among said plurality of printers within said multiple device printing environment during an imposition of said print job.

2. The method of claim 1 wherein each mark among said plurality of marks is associated with a particular index.

3. The method of claim 1 further comprising: establishing a directory of associations between at least one printer among said plurality of printers within said multiple-device printing environment and indices thereof, wherein each index among said indices is associated with a particular mark among said plurality of marks.

4. The method of claim 1 further comprising: establishing a database of location descriptions of each mark renderable upon at least one print job associated with each printer among said plurality of printers within said multiple device printing environment; and
    implementing indices thereof, wherein each index among said indices is associated with a particular location among a plurality of locations.

5. The method of claim 1 further comprising:
    providing a linker which receives a name associated with said at least one printer;
    automatically searching for a location coordinate associated with said at least one mark utilizing said linker;
    dynamically determining at least one mark from among said plurality of marks; and
    embedding said at least one mark into said print job.

6. The method of claim 1 wherein automatically and dynamically rendering at least one mark among said plurality of marks upon said print job based on a required resource of said at least one printer among said plurality of printers within said multiple-device printing environment during an imposition of said print job, further comprises:
    placing said at least one mark upon at least one page associated with said print job.

7. The method of claim 1 wherein automatically and dynamically rendering at least one mark among said plurality of marks upon said print job based on a required resource of said at least one printer among said plurality of printers within said multiple-device printing environment during an imposition of said print job, further comprises:
    placing said at least one mark upon at least one press sheet associated with said print job.

8. The method of claim 1 wherein automatically and dynamically rendering at least one mark among said plurality of marks upon said print job based on a required resource of said at least one printer among said plurality of printers within said multiple-device printing environment during an imposition of said print job, further comprises:
    placing said at least one mark upon at least one page and at least one press sheet associated with said print job.

9. The method of claim 1 wherein said at least one mark comprises at least one of the following: a cut mark, a fold mark, a registration target, a density control strip, a slur star, and an administrative description.

10. A method, comprising:
    compiling a database comprising at least one mark and a plurality of marks thereof, wherein each mark is associated with a particular index among indices; and
    associating said database with a multiple-device printing environment;
    establishing a database of location descriptions of each mark renderable upon at least one print job associated with each printer among a plurality of printers within said multiple device printing environment wherein each location is associated with a particular index among indices;
    providing a linker which receives a name associated with at least one printer among said plurality of printers and automatically searches a directory of indices for a location coordinate associated with said at least one mark utilizing said linker, wherein said linker thereafter dynamically reads said at least one mark from among said plurality of marks maintained within said database comprising said at least one mark and a plurality of marks thereof and embeds said at least one mark into said print job.

11. A system, comprising:
    a database comprising a plurality of marks for use in rendering a print job within a multiple-device printing environment; and
    a module for identifying at least one printer among a plurality of printers in a multiple-device printing environment for rendering a print job, wherein a linker thereafter automatically and dynamically renders at least one mark upon said print job based on a required resource of said at least one printer among said plurality of printers within said multiple-device printing environment during an imposition of said print job.

12. The system of claim 11 wherein said database is associated with said multiple-device printing environment and said plurality of printers within said multiple-device printing environment and wherein each mark among said plurality marks within said database is associated with a particular index.

13. The method of claim 11 further comprising:
a directory of associations between at least one printer among said plurality of printers within said multiple-device printing environment and indices thereof, wherein each index among said indices is associated with a particular mark among said plurality of marks.

14. The system of claim 11 further comprising:
a directory of associations between at least one printer among said plurality of printers within said multiple-device printing environment and indices thereof, wherein each index among said indices is associated with a particular location among said plurality of locations; and
a database of location descriptions of each mark renderable upon at least one print job associated with each printer among said plurality of printers within said multiple-device printing environment.

15. The system of claim 11 wherein said module comprises a linker that receives a name associated with said at least one printer and automatically searches for a location coordinate associated with said at least one mark.

16. The system of claim 15 wherein said linker dynamically determines said at least one mark from among said plurality of marks and thereafter embeds said at least one mark into said print job.

17. The system of claim 11 wherein said module places said at least one mark upon at least one page associated with said print job.

18. The system of claim 11 wherein said module places at least one mark upon at least one press sheet associated with said print job.

19. The system of claim 11 wherein said module places at least one mark upon at least one page and at least one press sheet associated with said print job.

20. The system of claim 11 wherein said at least one mark comprises at least one of the following; a cut mark, a fold mark, a registration target, a density control strip, a slur star, and an administrative description.

* * * * *